(12) United States Patent
Takahashi et al.

(10) Patent No.: US 11,057,869 B2
(45) Date of Patent: Jul. 6, 2021

(54) BASE STATION AND TRANSMISSION CONTROL METHOD USING TERMINAL AND COORDINATION-PROVIDING BASE STATION CHANNEL QUALITY INFORMATION

(71) Applicant: Panasonic Intellectual Property Management Co., Ltd., Osaka (JP)

(72) Inventors: Ryo Takahashi, Miyagi (JP); Yuta Seki, Kanagawa (JP); Masayuki Hoshino, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 22 days.

(21) Appl. No.: 16/525,237

(22) Filed: Jul. 29, 2019

(65) Prior Publication Data

US 2019/0357195 A1 Nov. 21, 2019

Related U.S. Application Data

(62) Division of application No. 15/505,062, filed as application No. PCT/JP2016/000177 on Jan. 15, 2016, now Pat. No. 10,412,713.

(30) Foreign Application Priority Data

Feb. 26, 2015 (JP) .................... 2015-036502

(51) Int. Cl.
*H04W 72/04* (2009.01)
*H04B 17/309* (2015.01)
(Continued)

(52) U.S. Cl.
CPC ...... *H04W 72/0406* (2013.01); *H04B 17/309* (2015.01); *H04L 1/0001* (2013.01);
(Continued)

(58) Field of Classification Search
CPC . H04W 72/0406; H04W 16/28; H04W 28/16; H04W 24/02; H04B 17/309; H04L 5/0035; H04L 5/006
See application file for complete search history.

(56) References Cited

U.S. PATENT DOCUMENTS 9,008,060 B2  4/2015  Morimoto et al.
9,276,651 B2  3/2016  Kishiyama et al.
(Continued)

FOREIGN PATENT DOCUMENTS

JP  5189111 B2  4/2013
JP  5210278 B2  6/2013

OTHER PUBLICATIONS

International Search Report, dated Mar. 22, 2016, for corresponding International Application No. PCT/JP2016/000177, 4 pages.

*Primary Examiner* — Jackie Zuniga Abad
(74) *Attorney, Agent, or Firm* — Seed IP Law Group LLP

(57) ABSTRACT

In a base station that transmits data to a first terminal in coordination with a coordination-providing base station, and functions as a connection-making base station that instructs the coordination-providing base station on a transmission parameter that is used for coordinated communication, a reception processor receives first CSI between the connection-making base station and the first terminal from the first terminal, and, receives, from each of at least one or more second terminals other than the first terminal, second CSI between the connection-making base station and a second terminal, and third CSI between the coordination-providing base station and at least one second terminal, a CSI estimator configures the third CSI which corresponds to a terminal, to which the first CSI and the second CSI are the closest, of the at least one or more second terminals, as an estimation value of CSI between the coordination-providing base station and the first terminal.

2 Claims, 8 Drawing Sheets

(51) Int. Cl.
*H04L 5/00* (2006.01)
*H04W 16/28* (2009.01)
*H04W 28/16* (2009.01)
*H04L 1/00* (2006.01)
*H04W 24/02* (2009.01)
*H04B 17/382* (2015.01)

(52) U.S. Cl.
CPC ............ *H04L 1/0026* (2013.01); *H04L 5/006* (2013.01); *H04L 5/0035* (2013.01); *H04W 16/28* (2013.01); *H04W 24/02* (2013.01); *H04W 28/16* (2013.01); *H04W 72/0426* (2013.01); *H04W 72/0493* (2013.01); *H04B 17/382* (2015.01); *H04L 5/0023* (2013.01); *H04L 5/0092* (2013.01); *H04L 2001/0097* (2013.01)

(56) References Cited

U.S. PATENT DOCUMENTS

| | | | |
|---|---|---|---|
| 2012/0218962 | A1 | 8/2012 | Kishiyama et al. |
| 2012/0263068 | A1 | 10/2012 | Morimoto et al. |
| 2013/0272170 | A1 | 10/2013 | Chatterjee et al. |
| 2013/0322273 | A1* | 12/2013 | Etemad ................ H04W 24/10 370/252 |
| 2015/0215022 | A1 | 7/2015 | Nagata et al. |
| 2015/0318966 | A1* | 11/2015 | Liu ....................... H04W 28/16 370/329 |

\* cited by examiner

FIG. 5

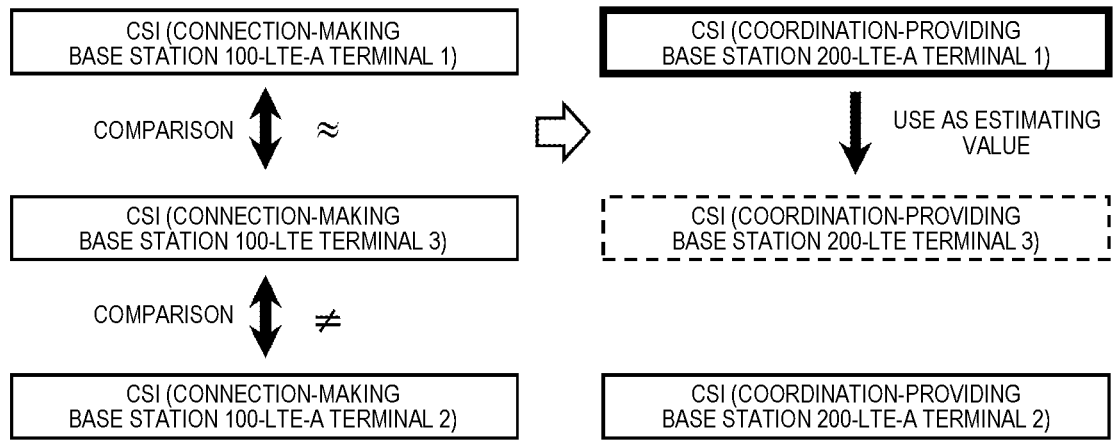

FIG. 6

| | RESULT OF EVALUATION | ESTIMATION PRECISION OF CSI | CSI (CQI AND PMI) THAT IS USED | TRANSMISSION CONTROL PROCESSING |
|---|---|---|---|---|
| (1) | RESULT OF COMPARISON WITH LTE-A TERMINAL IN TERMS OF CQI AND PMI IS THAT CQIs ARE APPROXIMATELY EQUAL TO EACH OTHER AND PMIs ARE APPROXIMATELY EQUAL TO EACH OTHER | A | Wideband CQI Subband CQI Wideband PMI Subband PMI | AMC CONTROL, FREQUENCY SCHEDULING, BEAM CONTROL |
| (2) | RESULT OF COMPARISON WITH LTE-A TERMINAL IN TERMS OF CQI IS THAT CQIs ARE APPROXIMATELY EQUAL TO EACH OTHER | B | Wideband CQI Subband CQI | AMC CONTROL, FREQUENCY SCHEDULING |
| (3) | RESULT OF COMPARISON WITH LTE-A TERMINAL IN TERMS OF PMI IS THAT PMIs ARE APPROXIMATELY EQUAL TO EACH OTHER | B | Wideband PMI Subband PMI | BEAM CONTROL |
| (4) | NO CORRESPONDENCE TO ANY ONE OF (1) TO (3) | D | — | — |

| RESULT OF EVALUATION | | ESTIMATION PRECISION OF CSI | CSI (CQI AND PMI) THAT IS USED | TRANSMISSION CONTROL PROCESSING |
|---|---|---|---|---|
| (5) | RSRP RATIOS OF LTE TERMINAL AND CoMP APPLICATION-TARGET TERMINAL ARE APPROXIMATELY EQUAL TO EACH OTHER | C | Wideband CQI | AMC CONTROL |
| (6) | NO CORRESPONDENCE TO (5) | D | — | — |

BASE STATION AND TRANSMISSION CONTROL METHOD USING TERMINAL AND COORDINATION-PROVIDING BASE STATION CHANNEL QUALITY INFORMATION

TECHNICAL FIELD

The present disclosure relates to a base station and a transmission control method.

BACKGROUND ART

In 3rd Generation Partnership Project (3GPP), management of base-station Coordinated Multi-Point (CoMP) transmission in LTE-Advanced that results from extending Long Term Evolution (LTE) has been studied. In the CoMP transmission, multiple base stations (which are also referred to as Base Stations (BS's) or evolved Node B's (eNB's)) transmit data to one terminal (which is also referred to as a Mobile Station (MS) or User Equipment (UE)) in a coordinated manner, and the terminal improves received quality in the terminal itself by performing compositing on pieces of data that are transmitted from the multiple base stations.

FIG. 1 is a diagram illustrating an example of a constitution of a communication system that performs the CoMP transmission, and illustrating an example of the terminal that is present in a cell that is covered by multiple base stations and each of the multiple base stations.

In the following description, a terminal that corresponds to an LTE system (for example, 3GPP Releases 8 and 9) is referred to as an "LTE terminal", and a terminal that corresponds to an LTE-Advanced system (for example, 3GPP Release 10 or later) is referred to as an "LTE-A terminal".

As illustrated in FIG. 1, in a case where the CoMP transmission is performed, multiple base stations are constituted from one base station (which is hereinafter also referred to as a connection-making base station or a Master BS) that decides contents of transmission control relating to the CoMP transmission, and a different base station (hereinafter also referred to as a coordination-providing base station or a Slave BS) that performs the CoMP transmission according to an instruction for CoMP transmission control from the connection-making base station.

Each of the connection-making base station and the coordination-providing base station transmits a Channel State Information Reference Signal (CSI-RS) toward the LTE-A terminal. When receiving the CSI-RS that is transmitted from each of the connection-making base station and the coordination-providing base station, the LTE-A terminal measures Channel State Information (CSI) and transmits the measured CSI to the connection-making base station for reporting. That is, the connection-making base station acquires the CSI between the connection-making base station and the LTE-A terminal and the CSI between the coordination-providing base station and the LTE-A terminal from the LTE-A terminal that has a connection to the connection-making base station itself.

Included in the CSI are a Channel Quality Indicator (CQI) indicating channel quality, a Precoding Matrix Indicator (PMI) indicating channel phase information, and the like.

The connection-making base station optimizes control of the CoMP transmission using the CSI for the connection-making base station and the CSI for the coordination-providing base station, which are reported from the LTE-A terminal. Examples of a method of controlling the CoMP transmission, Adaptive Modulation Coding (AMC) control, frequency scheduling, beam control, and the like, are given.

Incidentally, as illustrated in FIG. 1, in some cases, in a communication system, in addition to the LTE-A terminal that is capable of performing the CoMP communication, the LTE terminal is present in a mixed manner. However, as is the case with the CoMP transmission, it is not stipulated that, in the LTE system, a signal is transmitted in a coordinated manner from multiple base station to one LTE terminal. Furthermore, it is stipulated that, in the LTE system, the LTE terminal reports the CSI between the base station and the LTE terminal using a Cell-specific Reference Signal (CRS) that is transmitted from one base station that has a connection. However, it is not stipulated that the LTE terminal reports the CSI for a base station other than the connection-making base station, for example, the coordination-providing base station in FIG. 1, using the CSI-RS that is transmitted from multiple base stations. More precisely, it is difficult to cause the CoMP transmission to apply to the LTE terminal.

In contrast, PTL 1 discloses a method in which the terminal transmits the CQI for the connection-making base station and the CQI for the coordination-providing base station in a time-division manner in every subframe. The base station accomplishes optimization of the CoMP transmission by optimizing transit power of each base station using the CQI for each base station, which is transmitted from the terminal.

CITATION LIST

Patent Literature

PTL 1: Japanese Patent No. 5189111

SUMMARY OF THE INVENTION

However, in the method that is disclosed in PTL 1, a CQI for a different base station cannot be measured or transmitted while the LTE terminal measures or transmits a CQI for a certain base station. On the other hand, as described above, in the LTE-Advanced system, it is possible that the connection-making base station acquires CSIs for multiple base stations from the LTE-A terminal at the same time. Therefore, in PTL 1, it takes time for the connection-making base station to acquire CQIs for multiple base stations from the LTE terminal and cause the CoMP transmission to apply to the LTE terminal, when compared with the LTE-Advanced system.

Furthermore, in the method that is disclosed in PTL 1, the LTE terminal needs to newly include a function for measuring the CSI and transmitting the measured CSI to each of the multiple base stations.

An object of the invention according to an aspect of the present disclosure is to provide a base station and a transmission control method, in which CoMP transmission can apply also to an LTE terminal in the same manner as the CoMP transmission applies to an LTE-A terminal without extending a function of the LTE terminal.

According to an aspect of the present disclosure, there is provided a base station transmits data to a first terminal in coordination with a coordination-providing base station, and functions as a connection-making base station that instructs the coordination-providing base station on a transmission parameter that is used for coordinated communication, the base station being constituted to include: a reception unit receives first Channel State Information (CSI) between the connection-making base station and the first terminal from the first terminal, and, receives, from each of at least one or more second terminals other than the first terminal, second CSI between the connection-making base station and each of the at least one or more second terminals, and third CSI between the coordination-providing base station and each of the at least one or more second terminals; an estimator that configures the third CSI which corresponds to a terminal, to which the first CSI and the second CSI are the closest, of the at least one or more second terminals, as an estimation value of CSI between the coordination-providing base station and the first terminal; and a decision unit that decides the transmission parameter using the first CSI and the estimation value.

According to another aspect of the present disclosure, there is provided a base station that transmits data to a first terminal in coordination with a connection-making base station, and functions as a coordination-providing base station that receives a transmission parameter that is used for coordinated transmission, from the connection-making base station, the base station being constituted to include: a reception unit that receives, from each of at least one or more second terminals other than the first terminal, Channel State Information (CSI) between the coordination-providing base station and each of the at least one or more second terminals, first Reference Signal Received Power (RSRP) indicating received power of a reference signal that is transmitted from the connection-making base station in each of the at least one or more second terminals, and second RSRP indicating received power of a reference signal that is transmitted from the coordination-providing base station in the second terminals; and an estimator that configures the CSI that corresponds to a terminal that has a ratio between the first RSRP and the second RSRP which is within a prescribed range, of the at least one or more second terminals, as an estimation value of CSI between the coordination-providing base station and the first terminal, and notifies the connection-making base station of the configured CSI.

According to still another aspect of the present disclosure, there is provided a transmission control method in a base station that transmits data to a first terminal in coordination with a coordination-providing base station, and functions as a connection-making base station that instructs the coordination-providing base station on a transmission parameter that is used for coordinated communication, the transmission control method including: receiving first Channel State Information (CSI) between the connection-making base station and the first terminal from the first terminal; receiving, from each of at least one or more second terminals other than the first terminal, second CSI between the connection-making base station and each of the at least one or more second terminals, and third CSI between the coordination-providing base station and each of the at least one or more second terminals; configuring the third CSI which corresponds to a terminal, to which the first CSI and the second CSI are the closest, of the at least one or more second terminals, as an estimation value of CSI between the coordination-providing base station and the first terminal; and deciding the transmission parameter using the first CSI and the estimation value.

According to still another aspect of the present disclosure, there is provided a transmission control method in a base station that transmits data to a first terminal in coordination with a connection-making base station, and functions as a coordination-providing base station that receives a transmission parameter that is used for coordinated transmission, from the connection-making base station, the transmission control method including: receiving, from each of at least one or more second terminals other than the first terminal, Channel State Information (CSI) between the coordination-providing base station and each of the at least one or more second terminals, first Reference Signal Received Power (RSRP) indicating received power of a reference signal that is transmitted from the connection-making base station in each of the at least one or more second terminals, and second RSRP indicating received power of a reference signal that is transmitted from the coordination-providing base station in each of the at least one or more second terminals; configuring the CSI that corresponds to a terminal that has a ratio between the first RSRP and the second RSRP which is within a prescribed range, of the at least one or more second terminals, as an estimation value of CSI between the coordination-providing base station and the first terminal; and notifying the connection-making base station of the configured CSI.

According to an aspect of the present disclosure, CoMP transmission can apply also to an LTE terminal in the same manner as the CoMP transmission applies to an LTE-A terminal, without extending a function of the LTE terminal.

BRIEF DESCRIPTION OF DRAWINGS

FIG. 5 is a diagram that serves to provide a description of CSI estimation processing according to the first embodiment.

FIG. 6 is a diagram that serves to provide a description of coordinated transmission control processing in the connection-making base station according to the first embodiment.

DESCRIPTION OF EMBODIMENTS

Each embodiment of an invention according to an aspect of the present disclosure will be described with reference to the drawings.

A case where each embodiment applies to a mobile communication system that uses the LTE specifications and the LTE-Advanced specifications will be described below, but no limitation to this is imposed.

First Embodiment

Overview of a Communication System

Figure 1:
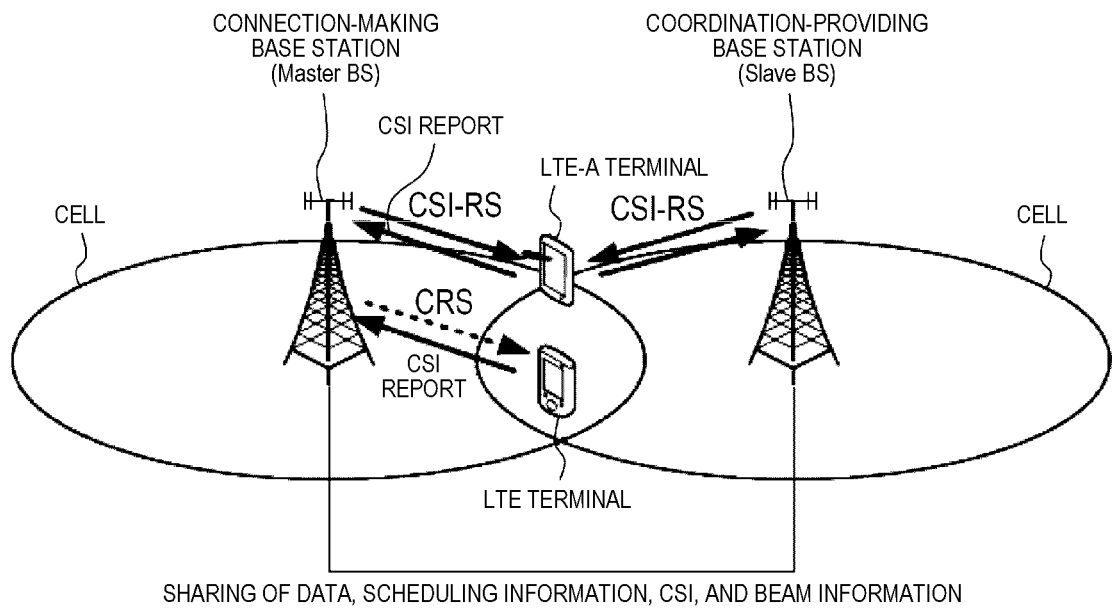
FIG. 1 is a diagram illustrating an example of a constitution of a communication system that performs CoMP transmission.
Figure 2:
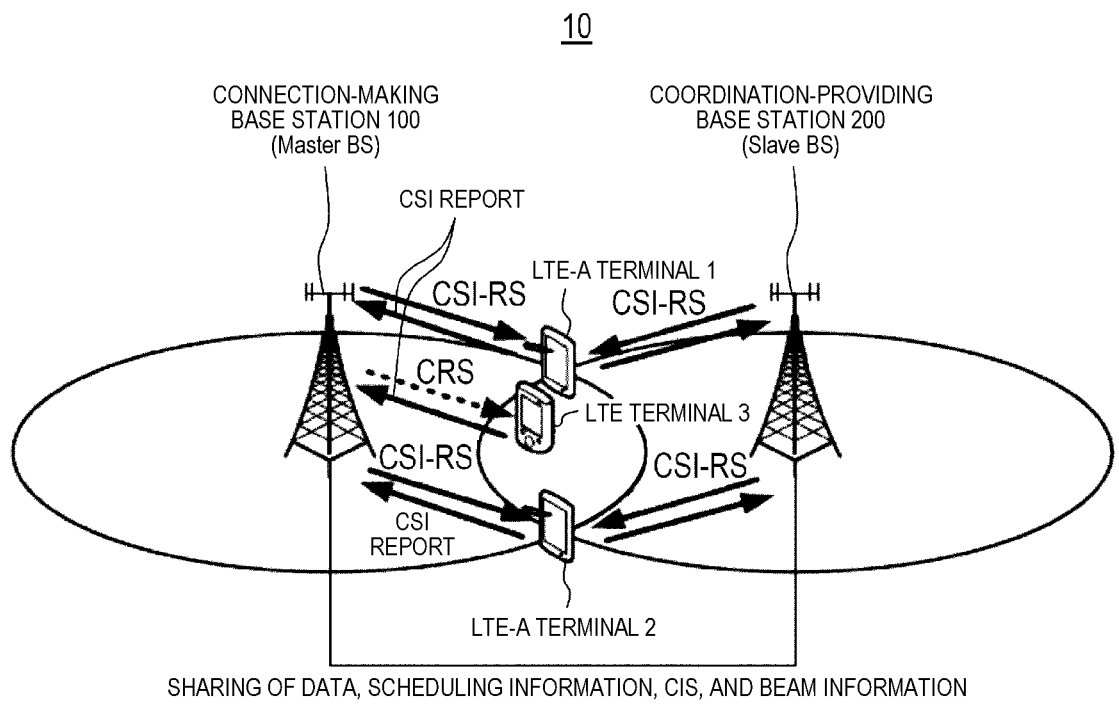
FIG. 2 is a diagram illustrating an example of a constitution of a communication system according to a first embodiment.

FIG. 2 is a diagram illustrating an example of a constitution of a communication system according to the present embodiment. In communication system 10 that is illustrated in FIG. 2, as is the case in FIG. 1, two base stations perform CoMP transmission on one terminal.

For example, in FIG. 2, connection-making base station 100 and coordination-providing base station 200 perform the CoMP transmission on one CoMP application-target terminal. In the present embodiment, a case where the CoMP application-target terminal is an LTE terminal is described.

Furthermore, in the present embodiment, a case where the LTE terminal and an LTE-A terminal are present in a mixed manner in communication system 10 that is illustrated in FIG. 2 is assumed. In FIG. 2, as one example, LTE terminal 3 and LTE-A terminals 1 and 2 are set to be connected to connection-making base station 100. Furthermore, LTE terminal 3 and LTE-A terminals 1 and 2 are located in an area, that is, a cell edge where cells of both of connection-making base station 100 and coordination-providing base station 200 overlap.

Furthermore, connection-making base station 100 and coordination-providing base station 200 transmits a CSI-RS to LTE-A terminals 1 and 2, and transmits a CRS to LTE terminal 3.

Consequently, LTE terminal 3 that has a connection to connection-making base station 100 can measure and report a CSI between connection-making base station 100 and LTE terminal 3, using the CRS that is transmitted from connection-making base station 100 and can report a result of the measurement, but cannot measure and report a CSI between coordination-providing base station 200 and LTE terminal 3.

Constitutions of Connection-making Base Station 100 and Coordination-providing Base Station 200

Figure 3:
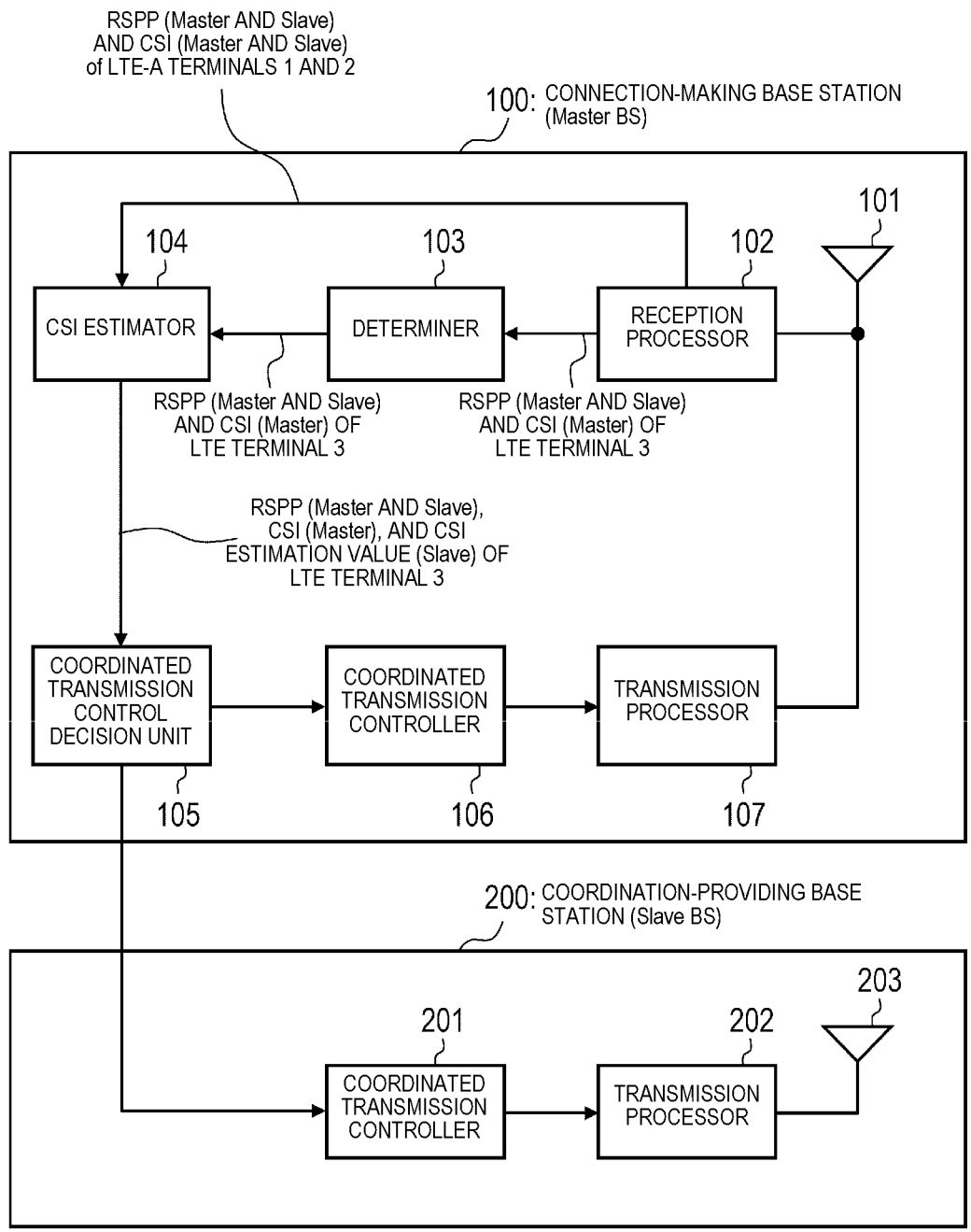
FIG. 3 is a block diagram illustrating constitutions of a connection-making base station and a coordination-providing base station according to the first embodiment.

FIG. 3 is a block diagram illustrating constitutions of connection-making base station 100 and coordination-providing base station 200 according to the present embodiment. In FIG. 3, portions of the constitutions of connection-making base station 100 and coordination-providing base station 200, which are associated with the invention according to the aspect of the present disclosure, are mostly illustrated.

Connection-making base station 100 is a base station that decides a transmission parameter that is used for coordinated communication in the CoMP transmission by connection-making base station 100 and coordination-providing base station 200, and that instructs coordination-providing base station 200 on the decided transmission parameter. As illustrated in FIG. 3, connection-making base station 100 includes antenna 101, reception processor 102, determiner 103, CSI estimator 104, coordinated transmission control decision unit 105, coordinated transmission controller 106, and transmission processor 107.

Reception processor 102 performs reception processing, for example, A/D conversion, down-converting, and the like, on a signal that is received through antenna 101, and outputs a signal that goes through the reception processing, to determiner 103 and CSI estimator 104.

Included in a reception signal are pieces of information that are transmitted from LTE terminal 3 and LTE-A terminals 1 and 2, which are connected to connection-making base station 100.

For example, as the information that is transmitted from LTE terminal 3, Reference Signal Received Power (RSRP) that is measured using a reference signal that is transmitted from each of connection-making base station 100 and coordination-providing base station 200, and CSI that is measured using the CRS that is transmitted from connection-making base station 100 are included.

Furthermore, as the information that is transmitted from LTE-A terminals 1 and 2, the RSRP that is measured using the reference signal which is transmitted from each of connection-making base station 100 and coordination-providing base station 200, and the CSI that is measured using the CSI-RS which is transmitted from each of connection-making base station 100 and coordination-providing base station 200 are included.

The RSRP and the CSI that are generated using the reference signal, the CSI-RS, or the CRS that is transmitted from connection-making base station 100 are here expressed as "RSRP (Master)" and "CSI (Master)", respectively. Furthermore, the RSRP and the CSI that are generated using the reference signal, the CSI-RS, or the CRS that is transmitted from coordination-providing base station 200 are expressed as "RSRP (Slave)" and "CSI (Slave)", respectively. Furthermore, the RSRP for connection-making base station 100 and the RSRP for coordination-providing base station 200, and the CSI for connection-making base station 100 and the CSI for coordination-providing base station 200, are collectively expressed as RSRP (Master and Slave) and "CSI (Master and Slave)", respectively.

Reception processor 102 outputs the RSRP (Master and Slave) and the CSI (Master) of LTE terminal 3 to determiner 103. Furthermore, reception processor 102 outputs the RSRP (Master and Slave) the CSI (Master and Slave) for LTE-A terminals 1 and 2 to CSI estimator 104.

Based on the information of LTE terminal 3 that is received from reception processor 102, determiner 103 determines whether or not to start application of the CoMP transmission to LTE terminal 3. For example, when it comes to LTE terminal 3, in a case where a difference between the RSRP (Master) for connection-making base station 100 and the RSRP (Slave) for coordination-providing base station 200 is less than a prescribed threshold, determiner 103 may determine that the CoMP transmission to LTE terminal 3 is started. The case where the difference between the RSRP (Master) and the RSRP (Slave) is less than the prescribed threshold assumes that LTE terminal 3 is located in cell edge areas of connection-making base station 100 and coordination-providing base station 200. For example, LTE terminal 3 is located as is illustrated in FIG. 2. In a case where starting of the application of the CoMP transmission to LTE terminal 3 is decided, determiner 103 outputs the RSRP (Master and Slave) and the CSI (Master) of LTE terminal 3 to CSI estimator 104.

In a case where the CSI (Slave) of LTE terminal 3 is not present, CSI estimator 104 estimates the CSI (Slave) of LTE terminal 3, using the CSI (Master) of LTE terminal 3 that is received from determiner 103 and the pieces of CSI (Master and Slave) of LTE-A terminals 1 and 2 that are received from reception processor 102. CSI estimator 104 outputs the RSRP (Master and Slave) and the CSI (Master) of LTE terminal 3 and a CSI estimation value (Slave) that is estimated, to coordinated transmission control decision unit 105. CSI estimation processing in CSI estimator 104 will be described in detail below.

Coordinated transmission control decision unit 105 decides the transmission parameter that is used for the coordinated communication, using the RSRP (Master and Slave) and the CSI (Master) of LTE terminal 3 that are received from CSI estimator 104, and the CSI estimation value (Slave). As examples of control processing in the coordinated communication, AMC control, frequency scheduling, and beam control are given. Coordinated transmission control decision unit 105 outputs and transmits coordinated transmission control information that indicates the decided transmission parameter, to coordinated transmission controller 106 and coordination-providing base station 200, respectively. The control processing of the coordinated communication, that is, decision processing of the transmission parameter, in coordinated transmission control decision unit 105, will be described in detail below.

Coordinated transmission controller 106 performs control processing of the CoMP transmission on data (not illustrated) on LTE terminal 3, according to the coordinated transmission control information that is received from coordinated transmission control decision unit 105, and outputs the data that goes through the control processing, to transmission processor 107.

Transmission processor 107 performs transmission processing, for example, up-converting, D/A conversion, or the like, on the data that is received from coordinated transmission controller 106, and transmits the signal that goes through the transmission processing, to LTE terminal 3 through antenna 101.

A case where the CoMP application-target terminal is the LTE terminal is here described. Even in a case where the CoMP application-target terminal is the LTE-A terminal, as described above, estimation processing of the CSI may be performed with CSI estimator 104 in connection-making base station 100, and contents of coordinated communication control may be decided using the CSI of the terminal that is in proximity to the LTE-A terminal. Alternatively, without performing the estimation processing of the CSI with CSI estimator 104 in connection-making base station 100, the contents of the coordinated communication control may be decided coordinated transmission control decision unit 105, using the RSRP (Master and Slave) and the CSI (Master and Slave) that are transmitted from the LTE-A terminal which is the CoMP application-target terminal.

Coordination-providing base station 200 is the base station that performs the CoMP transmission according to transmission control by connection-making base station 100. As illustrated in FIG. 3, coordination-providing base station 200 includes coordinated transmission controller 201, transmission processor 202, and antenna 203.

Coordinated transmission controller 201 performs the control processing of the CoMP transmission on the data (not illustrated) on LTE terminal 3, according to the coordinated transmission control information that is received from coordinated transmission control decision unit 105 of connection-making base station 100, and outputs the data that goes through the control processing, to transmission processor 202.

Transmission processor 202 performs the transmission processing, for example, the up-converting, the D/A conversion, or the like, on data that is received from coordinated transmission controller 201, and transmits the signal that goes through the transmission processing, to LTE terminal 3 through antenna 203.

Operation of Each of Connection-making Base Station 100 and Coordination-providing Base Station 200

Next, operation of each of connection-making base station 100 and coordination-providing base station 200 that are described above is described.

Figure 4:
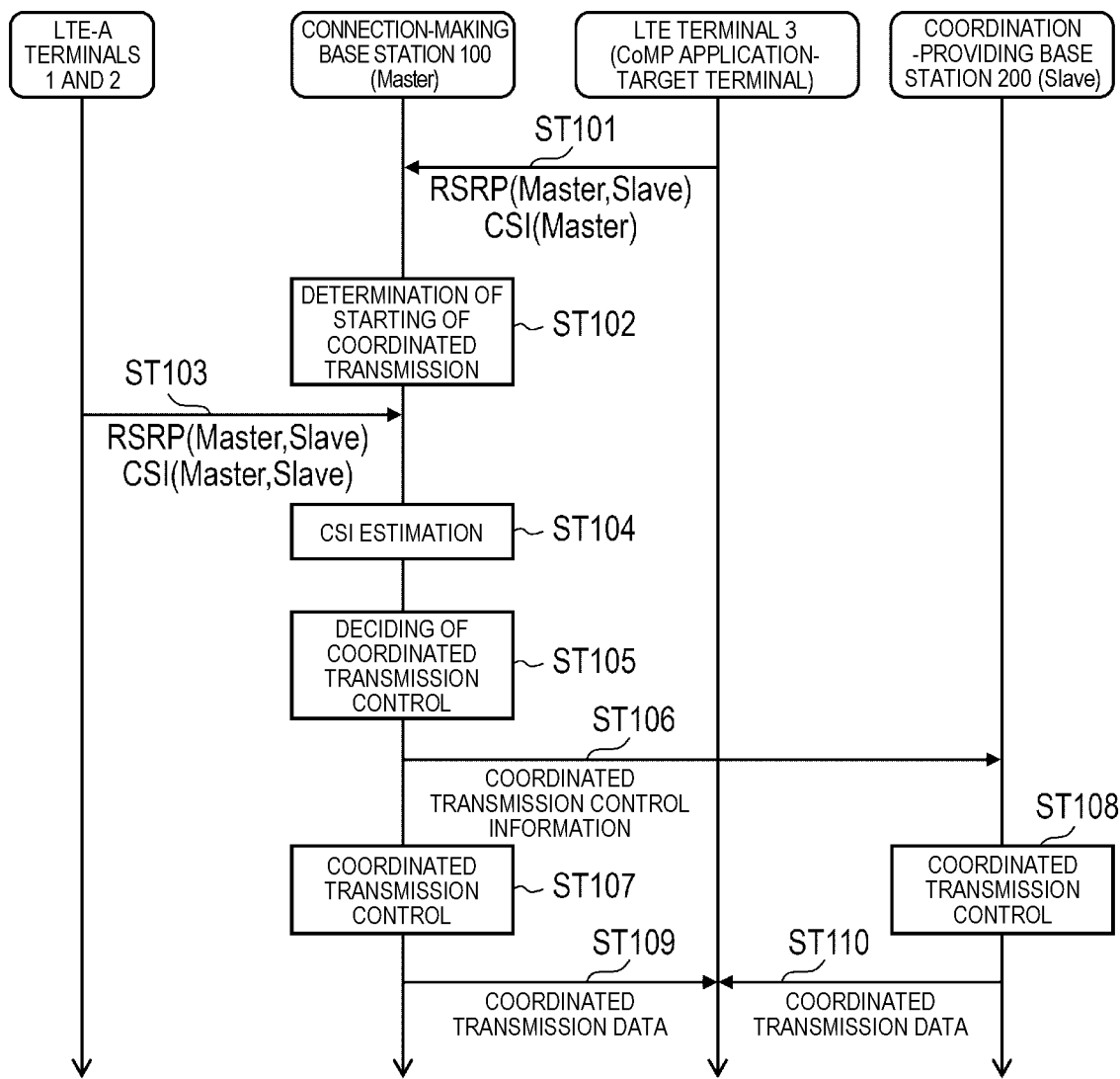
FIG. 4 is a sequence diagram illustrating CoMP transmission processing according to the first embodiment.

FIG. 4 is a sequence diagram illustrating operation at the time of the CoMP transmission, of each apparatus in communication system 10 that is illustrated in FIG. 2.

In Step (which is hereinafter expressed as simply "ST") 101 in FIG. 4, LTE terminal 3 reports to connection-making base station 100 the RSRP (Master and Slave) that is measured using the reference signals which are transmitted from connection-making base station 100 and coordination-providing base station 200, and the CSI (Master) that is measured using the CRS which is transmitted from connection-making base station 100. More precisely, LTE terminal 3 does not report the CSI (Slave) to connection-making base station 100.

In ST 102, based on the information of the LTE terminal 3 that is acquired in ST 101, connection-making base station 100 determines whether or not to start the application of the CoMP transmission to LTE terminal 3. Connection-making base station 100 is here set to determine that the CoMP transmission applies to LTE terminal 3.

In ST 103, LTE-A terminals 1 and 2 reports to connection-making base station 100 the RSRP (Master and Slave) and the CSI (Master and Slave) that are measured using the reference signals which are transmitted from connection-making base station 100 and coordination-providing base station 200, respectively.

A timing at which the transmission processing by LTE-A terminals 1 and 2, which is illustrated in ST 103, is performed, is not limited to a point in time after the processing in ST 102, and the transmission processing by LTE-A terminals 1 and 2 may be individually until ST 104 that will be described below.

In ST 104, connection-making base station 100 estimates the CSI (Slave) of LTE terminal 3 for coordination-providing base station 200, using the CSI (Master) of LTE terminal 3 that is acquired in ST 101 and the CSI (Master and Slave) of LTE-A terminals 1 and 2 that is acquired in ST 103. ST 104 will be described in detail below.

In ST 105, connection-making base station 100 decides the transmission parameter that is used for the CoMP transmission to LTE terminal 3, using the CSI (Master) and the RSRP (Master and Slave) of LTE terminal 3, which are acquired in ST 101, and the CSI (Slave) that is estimated in ST 104. ST 105 will be described in detail below.

In ST 106, connection-making base station 100 transmits the coordinated transmission control information that indicates the transmission parameter which is decided in ST 105, to coordination-providing base station 200.

In ST 107, connection-making base station 100 performs CoMP transmission control on LTE terminal 3 according to the contents that are decided in ST 105, and, in ST 108, coordination-providing base station 200 performs the CoMP transmission control on LTE terminal 3 according to the contents that are indicated by the coordinated transmission control information which is designated by connection-making base station 100 in ST 106.

In ST 109 and ST 110, connection-making base station 100 and coordination-providing base station 200 transmit coordinated communication data to LTE terminal 3 in coordination with each other.

CSI Estimation Processing

Next, the CSI estimation processing in CSI estimator 104 of connection-making base station 100, which is the processing in ST 104, is described in detail.

FIG. 5 is a diagram that serve to provide a description of the CSI estimation processing in connection-making base station 100.

As illustrated in FIG. 5, first, connection-making base station 100 compares the CSI (Master) between connection-making base station 100 itself and LTE terminal 3, and the CSI (Master) between connection-making base station 100 itself and each of LTE-A terminals 1 and 2, with each other. Connection-making base station 100 selects the LTE-A terminal that corresponds to the CSI (Master) which is the closest to the CSI (Master) of LTE terminal 3, of LTE-A terminals 1 and 2.

Specifically, connection-making base station 100 compares a CQI and a PMI that are included in the CSI of LTE terminal 3, and CQIs and PMIs that are included in the pieces of CSI of the LTE-A terminals 1 and 2, with each other, and, based on a difference in CQI between LTE terminal 3 and LTE-A terminals 1 and 2 and a difference in PMI between the LTE terminal and LTE-A terminals 1 and 2, selects the LTE-A terminal that corresponds to the CSI that is suitable as the CSI of LTE terminal 3.

For example, connection-making base station 100 may provide a threshold for the difference in CQI between LTE terminal 3 and LTE-A terminals 1 and 2, or for the difference in PMI between LTE terminal 3 and LTE-A terminals 1 and 2, and may select one LTE-A terminal that corresponds to the CQI and the PMI that are the closest to those of LTE terminal 3, of the LTE-A terminals, the differences relating to which satisfy the threshold. For example, connection-making base station 100 may provide the threshold for the difference in CQI between LTE terminal 3 and LTE-A terminals 1 and 2, or for the difference in PMI between LTE terminal 3 and LTE-A terminals 1 and 2, and may select one LTE-A terminal that corresponds to an average value of pieces of CSI of multiple LTE-A terminals, the differences relating to which satisfy the threshold.

In FIG. 5, the CSI (Master) of LTE-A terminal 1 and the CSI (Master) of LTE terminal 3 approximate to each other, and the CSI (Master) of LTE-A terminal 2 and the CSI (Master) of LTE terminal 3 does not approximate to each other. Accordingly, connection-making base station 100 selects LTE-A terminal 1.

Next, connection-making base station 100 configures the CSI (Slave) between the coordination-providing base station 200 and selected LTE-A terminal 1, as the CSI (Slave) between coordination-providing base station 200 and LTE terminal 3.

More precisely, connection-making base station 100 uses the CSI (Slave) between coordination-providing base station 200 and LTE-A terminal 1 that is in a channel state which is at the same level of a channel state of LTE terminal 3 in connection-making base station 100, as the CSI (Slave) between coordination-providing base station 200 and LTE terminal 3.

The CSI estimation processing in connection-making base station 100 is described above.

Decision Processing for Coordinated Communication Control

Next, the coordinated transmission control processing in coordinated transmission control decision unit 105 of connection-making base station 100, which is the processing in ST 105, is described in detail.

FIG. 6 is a diagram that serves to provide a description of an example of the coordinated transmission control processing in connection-making base station 100.

Connection-making base station 100 evaluates estimation precision of a CSI estimation value (Slave) of LTE terminal 3, which is estimated using the CSI (Slave) of LTE-A terminal 1. Connection-making base station 100, for example, as illustrated in FIG. 6, decides the coordinated transmission control processing based on results (1) to (3) of evaluation.

As illustrated in FIG. 6, transmission control processing is associated with the result of the evaluation. A "Wideband CQI" indicating channel quality of an entire frequency band, and a "Subband CQI" indicating channel quality of each of the multiple subbands that are obtained by dividing the entire frequency band are included in the CQI that is included in the CSI. Furthermore, a "Wideband PMI" indicating phase information in the entire frequency band, and a "Subband PMI" indicating phase information on each of the multiple subbands are included in the PMI that is included in the CSI.

For example, the AMC control is the transmission control processing that is able to be controlled using the Wideband CQI and the Subband CQI. Furthermore, the frequency scheduling is the transmission control processing that is able to be controlled using the Subband CQI. Furthermore, the beam control is the transmission control processing that is able to be controlled using the Wideband PMI or the Subband PMI.

As illustrated in FIG. 6, estimation precision of the CSI for the result (1) of the evaluation, estimation precision of the CSI for the result (2) or (3) of the evaluation, and precision of the CSI for the result (4) of the evaluation are A, B, and C, respectively, and the estimation precision of the CSI increases in this order. Accordingly, connection-making base station 100 decides performing of the transmission control processing that corresponds to the result of the evaluation that has the highest CSI estimation precision among the obtained results of the evaluation.

Specifically, connection-making base station 100 determines whether or not the CQI/PMI that is included in the CSI (Master) of LTE terminal 3 and the CQI/PMI that is included in the CSI (Master) of LTE-A terminal 1 are approximately equal to each other. For example, in a case where a difference between a value of the CQI of LTE terminal 3 and a value of the CQI of LTE-A terminal 1, which corresponds to connection-making base station 100, is less than a threshold, connection-making base station 100 determines that the CQIs are approximately equal to each other (CQI evaluation: OK).

Furthermore, in a case where a difference between a value of the PMI of LTE terminal 3 and a value of the PMI of LTE-A terminal 1, which corresponds to connection-making base station 100, is consistent with each other, connection-making base station 100 determines that the PMIs are approximately equal to each other (PMI evaluation: OK).

When it comes to the result (1) of the evaluation, the CQI evaluation and the PMI evaluation are OK cases and the estimation precision of each of the CQI and the PMI in the CSI, both of which are used as the CSI estimation value (Slave) of LTE terminal 3 is evaluated as satisfactory (the CSI estimation precision: A). Connection-making base station 100 performs the transmission control processing using all parameters (the Wideband CQI, the Subband CQI, the Wideband PMI, and the Subband PMI) that are the CSI estimation values (Slave).

That is, connection-making base station 100 performs parameter and frequency scheduling in compliance with AMC, and the beam control using the CSI (Master) of LTE terminal 3 and the CSI estimation value (Slave), and decides the transmission parameter (an MCS, an allocation resource, pre-coding weight, or the like) relating to each transmission control operation.

When it comes to the result (2) of the evaluation, the PMI evaluation is NG, the CQI evaluation are the OK case, and the estimation precision of the CQI in the CSI, which is used as the CSI estimation value (Slave) of LTE terminal 3 is evaluated as satisfactory (the CSI estimation precision: B). Connection-making base station 100 performs the transmission control processing (the AMC control or the frequency scheduling) using the CQI (the Wideband CQI or the Subband CQI) among the CSI estimation values (Slave).

That is, connection-making base station 100 performs the parameter and frequency scheduling in compliance with the AMC, using the CSI (Master) of LTE terminal 3 and the CSI estimation value (Slave), and determines the transmission parameter (the MCS, the allocation resource, or the like) relating to each transmission control operation.

When it comes to the result (3) of the evaluation, the CQI evaluation is NG, the PMI evaluation are the OK case, and the estimation precision of the PMI in the CSI, which is used as the CSI estimation value (Slave) of LTE terminal 3 is evaluated as satisfactory (the CSI estimation precision: B). Connection-making base station 100 performs the transmission control processing (the beam control) using the PMI (the Wideband PMI or the Subband PMI) among the CSI estimation values (Slave).

That is, connection-making base station 100 performs the beam control using the CSI (Master) of LTE terminal 3 and the CSI estimation value (Slave), and determines the transmission parameter (the pre-coding weight or the like) relating to the beam control.

In the case of the result (4) of the evaluation that is a result of the evaluation that does not correspond to any one of the results (1) to (3) of the evaluation, the estimation precision of each of the CQI and the PMI in the CSI, both of which are used as the CSI estimation value (Slave) of LTE terminal 3 is evaluated as poor (the CSI estimation precision: C). Connection-making base station 100 does not perform the transmission control that uses the CSI estimation value (Slave).

When it comes to the transmission control processing, as examples of the transmission control processing that uses the CQI, the AMC control and the frequency scheduling are given, and as an example of the transmission control processing that uses the PMI, the beam control is given. However, no limitation to this is imposed and the transmission control processing may be transmission control processing that is able to be controlled using the CQI and the PMI.

The decision processing of the coordinated communication control in connection-making base station 100 is described above.

In this manner, according to the present embodiment, connection-making base station 100 configures the CSI (Slave) that corresponds to the LTE-A terminal, to which each of the pieces of CSI (Master) and the CSI (Master) of LTE terminal 3 are the closest, of the LTE-A terminals 1 and 2, as the CSI estimation value (Slave) between coordination-providing base station 200 and LTE terminal 3. Connection-making base station 100 decides processing for the coordinated communication control using the CSI (Master) that is reported from LTE terminal 3 and the CSI estimation value (Slave) of LTE terminal 3 that is estimated by connection-making base station 100.

That is, according to the present embodiment, connection-making base station 100 uses the CSI of LTE-A terminal 1 that is in proximity to LTE terminal 3, as the CSI estimation value (Slave) for coordination-providing base station 200 in LTE terminal 3. Accordingly, connection-making base station 100 can optimize the CoMP transmission control using the pieces of CSI (Master and Slave) of both of connection-making base station 100 and coordination-providing base station 200 for LTE terminal 3.

Furthermore, connection-making base station 100 estimates the CSI (Slave) of LTE terminal 3 using the pieces of CSI (Master and Slave) from LTE-A terminals 1 and 2. Because of this, connection-making base station 100 may acquire only the CSI (Master) for connection-making base station 100 from LTE terminal 3, in the same manner as in the related art. That is, if LTE terminal 3 performs the same processing as in the related art, this is desirable and LTE terminal 3 does not need to be equipped with a new function for the application of the CoMP transmission.

Furthermore, connection-making base station 100 acquires the pieces of CSI that are transmitted from LTE-A terminals 1 and 2 and LTE terminal 3, at the same time. Because of this, connection-making base station 100 can acquire the CSI (Master) for connection-making base station 100, which is reported from LTE terminal 3, and the CSI (Slave) that is estimated by connection-making base station 100, for example, within the same subframe, at the same time, and can cause the CoMP transmission to apply in the same manner as in LTE-A terminals 1 and 2.

Consequently, according to the present embodiment, the CoMP transmission can apply also to LTE terminal 3 in the same manner as the CoMP transmission applies to LTE-A terminals 1 and 2, without extending a function of LTE terminal 3.

Additionally, according to the present embodiment, connection-making base station 100 evaluates the estimation precision of the CSI estimation value (Slave), and decides the transmission control processing that is performed, based on a result of the evaluation. Accordingly, connection-making base station 100 is able to perform the transmission control in accordance with the estimation precision of the CSI estimation value (Slave), and can optimize the CoMP transmission control.

Second Embodiment

Overview of the Communication System

According to the first embodiment, the case is described where the CSI of the LTE-A terminal that is present in the vicinity of the CoMP application-target terminal is used. In contrast, according to the present embodiment, a case is described where only the LTE terminal is present without the presence of the LTE-A terminal in the vicinity of the CoMP application-target terminal.

Figure 7:
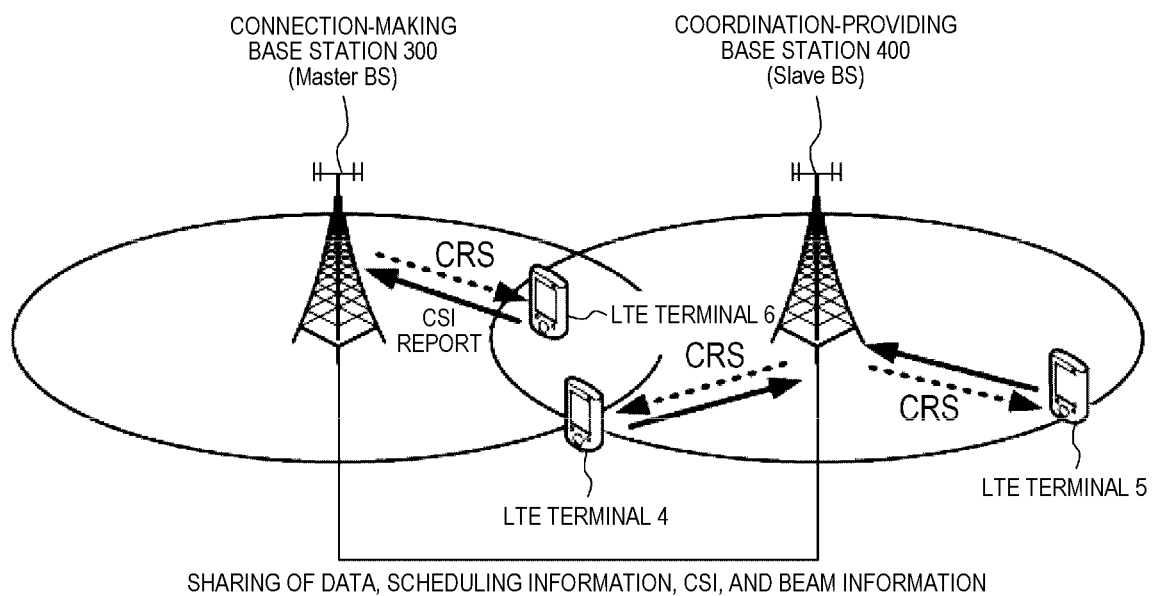
FIG. 7 is a diagram illustrating an example of a constitution of a communication system according to a second embodiment.

FIG. 7 illustrates an example of a constitution of a communication system according to the present embodiment. In communication system 20 that is illustrated in FIG. 7, connection-making base station 300 and coordination-providing base station 400 performs the CoMP transmission on one CoMP application-target terminal. In the present embodiment, the case where the CoMP application-target terminal is an LTE terminal is described.

Furthermore, according to the present embodiment, as an example, LTE terminal 6 that is the CoMP application-target terminal is set to be connected to connection-making base station 300, and LTE terminals 4 and 5 are set to be connected to coordination-providing base station 400. Furthermore, LTE terminal 6 and LTE terminal 4 are located in a cell edge that is an area where cells of both of connection-making base station 300 and coordination-providing base station 400 overlap.

Furthermore, connection-making base station 300 transmits the CRS to LTE terminal 6, and coordination-providing base station 400 transmits the CRS to LTE terminals 4 and 5.

Consequently, LTE terminal 6 that has a connection to connection-making base station 300 can measure and report the CSI between connection-making base station 300 and LTE terminal 6 using the CRS that is transmitted from connection-making base station 300, but cannot measure and report the CSI between coordination-providing base station 400 and LTE terminal 6.

Constitutions of Connection-making Base Station 300 and Coordination-providing Base Station 400

Figure 8:
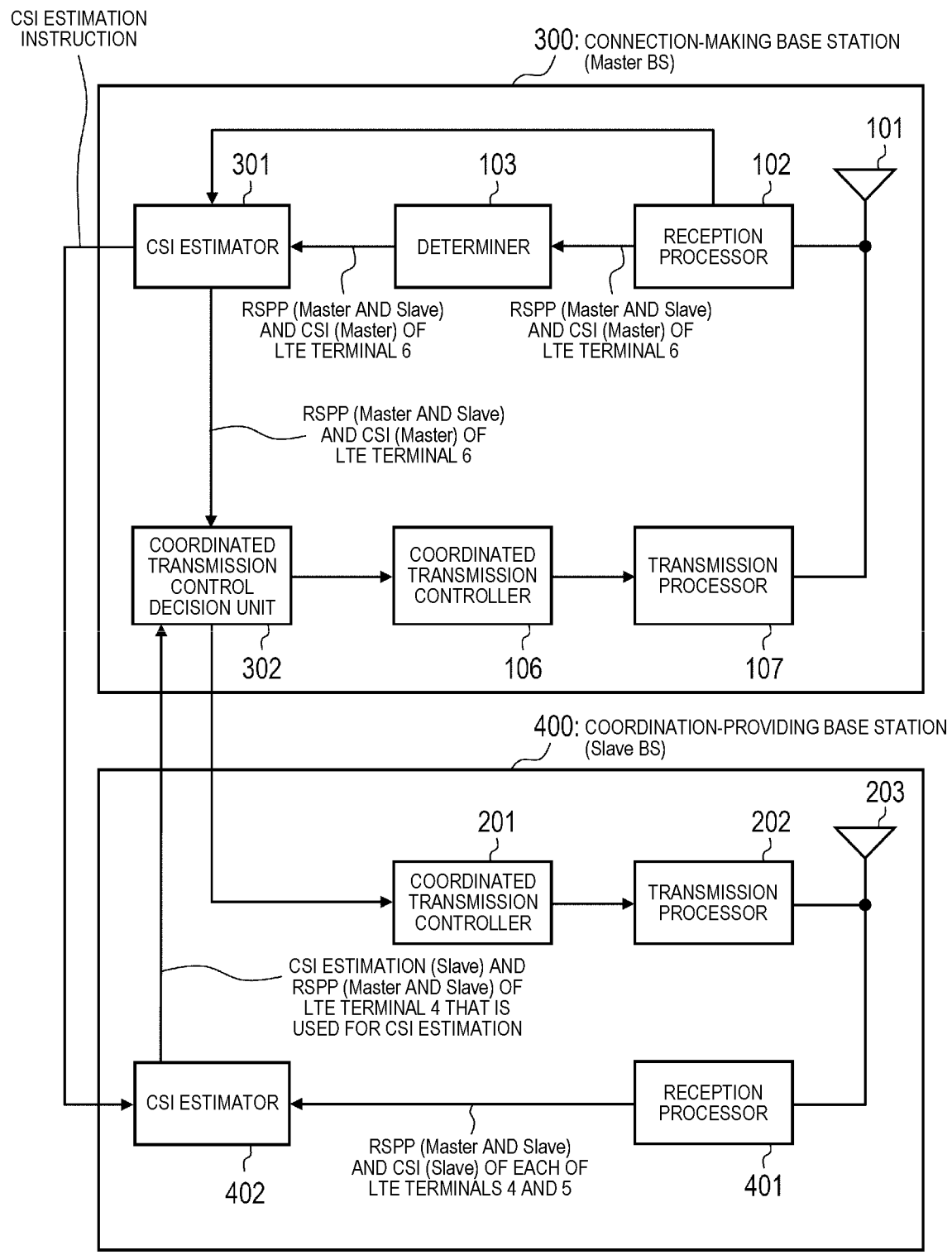
FIG. 8 is a block diagram illustrating constitutions of a connection-making base station and a coordination-providing base station according to the second embodiment.

FIG. 8 is a block diagram illustrating constitutions of connection-making base station 300 and coordination-providing base station 400 according to the present embodiment. In FIG. 8, a constituent element that performs the same operation as described with reference to FIG. 3 according to the first embodiment is given the same reference character, and a description thereof is omitted.

As illustrated in FIG. 8, connection-making base station 300 includes antenna 101, reception processor 102, determiner 103, CSI estimator 301, coordinated transmission control decision unit 302, coordinated transmission controller 106, and transmission processor 107.

In a case where the CSI (Slave) of LTE terminal 6 is not present, CSI estimator 301 instructs CSI estimator 402 of coordination-providing base station 400, which will be described below, to estimate the CSI (Slave) of LTE terminal 6 through a communication network that is not illustrated. Furthermore, CSI estimator 301 outputs the RSRP (Master and Slave) and the CSI (Master) of LTE terminal 6 to coordinated transmission control decision unit 302.

Coordinated transmission control decision unit 302 decides the transmission parameter that is used for the coordinated communication, using the RSRP (Master and Slave) and the CSI (Master) of LTE terminal 6, which are received from CSI estimator 301, the CSI estimation value (Slave) that is received from CSI estimator 402 of coordination-providing base station 400, which will be described below, and the RSRP (Master and Slave) of the LTE terminal, which is used for the CSI estimation. The control processing of the coordinated communication, that is, decision processing of the transmission parameter, in coordinated transmission control decision unit 302, will be described in detail below.

As illustrated in FIG. 8, coordination-providing base station 400 includes coordinated transmission controller 201, transmission processor 202, antenna 203, reception processor 401, and CSI estimator 402.

Reception processor 401 performs the reception processing, for example, the A/D conversion, the down-converting, and the like, on a signal that is received through antenna 203, and outputs a signal that goes through the reception processing, to CSI estimator 402. Included in a reception signal are pieces of information that are transmitted from LTE terminals 4 and 5 which are connected to coordination-providing base station 400. For example, the CSI (Slave) that is measured in LTE terminals 4 and 5 using the CRS that is transmitted from each of the connection-making base station 300 and coordination-providing base station 400, and the Reference Signal Received Power (RSRP (Master and Slave)) that is measured in LTE terminals 4 and 5 using the reference signal are included as pieces of information that are transmitted from LTE terminals 4 and 5.

CSI estimator 402 estimates the CSI (Slave) of LTE terminal 6 using the CSI (Slave) and the RSRP (Master and Slave) of each of LTE terminals 4 and 5, which are received from reception processor 401. CSI estimator 402 transmits the CSI estimation value (Slave) and the RSRP (Master and Slave) of the LTE terminal, which is used for the CSI estimation, to coordinated transmission control decision unit 302 of connection-making base station 300. CSI estimation processing in CSI estimator 402 will be described in detail below.

Operation of Each of Connection-making Base Station 300 and Coordination-providing Base Station 400

Next, operation of each of connection-making base station 300 and coordination-providing base station 400 that are described above is described.

Figure 9:
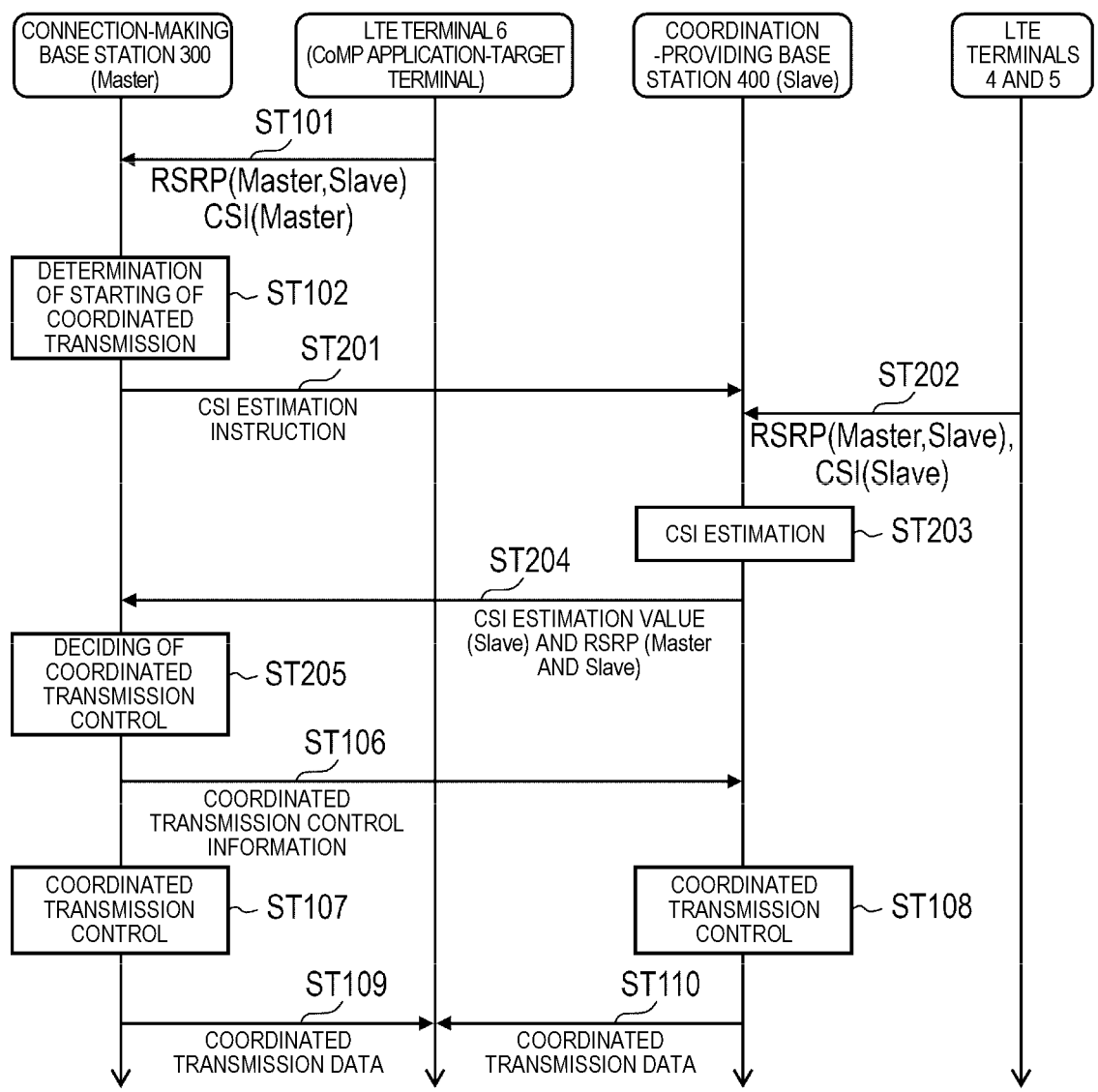
FIG. 9 is a sequence diagram illustrating CoMP transmission processing according to the second embodiment.

FIG. 9 is a sequence diagram illustrating operation at the time of the CoMP transmission, of each apparatus in communication system 20 that is illustrated in FIG. 7. In FIG. 9, the same operation as in FIG. 4 is given the same reference character, and a description thereof is omitted.

In FIG. 9, in ST 102, connection-making base station 300 is set to determine that the CoMP transmission is caused to apply to LTE terminal 6.

In ST 201, connection-making base station 300 transmits an instruction to estimate the CSI (Slave), to coordination-providing base station 400.

In ST 202, LTE terminals 4 and 5 that have connections to coordination-providing base station 400 report to coordination-providing base station 400 the RSRP (Master and Slave) that are measured using the reference signals that are transmitted from the connection-making base station 100 and coordination-providing base station 200, and the CSI (Slave) that is measured using the CRS.

In ST 203, when the instruction to estimate the CSI is received in ST 201, coordination-providing base station 400 estimate the CSI (Slave) of LTE terminal 6 for coordination-providing base station 400, using the RSRP (Master and Slave) of each of LTE terminals 4 and 5 that is acquired in ST 202.

In ST 204, coordination-providing base station 400 transmits a CSI value (Slave) that is measured in ST 203, and the RSRP (Master and Slave) of the LTE terminal, which is used for the CSI estimation, to connection-making base station 300.

In ST 205, connection-making base station 300 decides the transmission parameter that is used for the CoMP transmission to LTE terminal 6, using the CSI (Master) and the RSRP (Master and Slave) of LTE terminal 6, which are acquired in ST 101, and the CSI (Slave) and the RSRP (Master and Slave) that are acquired in ST 204.

CSI Estimation Processing

Next, the CSI estimation processing in CSI estimator 402 of coordination-providing base station 400, which is the processing in ST 203, is described in detail.

Figures 10, 11:
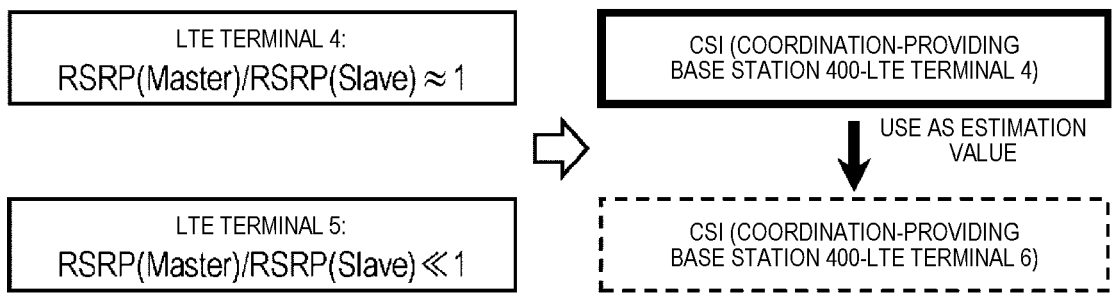
FIG. 10 is a diagram that serves to provide a description of CSI estimation processing according to the second embodiment.
FIG. 11 is a diagram that serves to provide a description of coordinated transmission control processing in the connection-making base station according to the second embodiment.

FIG. 10 is a diagram that serves to provide a description of the CSI estimation processing in coordination-providing base station 400.

As illustrated in FIG. 10, coordination-providing base station 400 calculates a ratio (which is hereinafter referred to as an RSRP ratio) between the RSRP (Master) for connection-making base station 300 and the RSRP (Slave) for coordination-providing base station 400 in each of LTE terminals 4 and 5 that have connections to coordination-providing base station 400.

At this point, as illustrated in FIG. 7, in the same manner as LTE terminal 6, LTE terminal 4 is located in cell edges of both of connection-making base station 300 and coordination-providing base station 400. Therefore, in LTE terminal 4, the reference signal that is transmitted from connection-making base station 300, and the reference signal that is transmitted from coordination-providing base station 400 are received at the same level. That is, an RSRP ratio that is calculated in LTE terminal 4 is a value that is close to 1.

On the other hand, as illustrated in FIG. 7, LTE terminal 5 is outside a cell of connection-making base station 300, and is located within a cell of coordination-providing base station 400. Therefore, in LTE terminal 5, a reception level of the reference signal that is transmitted from coordination-providing base station 400 is remarkedly high compared with the reference signal that is transmitted from connection-making base station 300. That is, the RSRP ratio that is calculated in LTE terminal 5 is a value that is remarkedly smaller than 1.

Coordination-providing base station 400 selects LTE terminal 4 that has the calculated RSRP ratio that is close to 1. Coordination-providing base station 400 configures the CSI (Slave) between the coordination-providing base station 400 and selected LTE terminal 4, as the CSI (Slave) between coordination-providing base station 400 and LTE terminal 6.

In this manner, coordination-providing base station 400 estimates that LTE terminal 4 that has the RSRP ratio that is close to 1 is a terminal that is located in the same edges of both of connection-making base station 300 and coordination-providing base station 400 as LTE terminal 6, and configures the CSI (Slave) of LTE terminal 4 as the CSI estimation value (Slave) of LTE terminal 6.

Connection-making base station 300 may include the RSRP (Master and Slave) of LTE terminal 6 in the instruction for the CSI to be estimated by coordination-providing base station 400. In this case, coordination-providing base station 400 may compare the RSRP ratio in LTE terminal 6 and the RSRP ratio in each of LTE terminals 4 and 5 with each other. That is, coordination-providing base station 400 selects LTE terminal 4 that has the calculated RSRP ratio which is close to the RSRP in LTE terminal 6. By doing this, coordination-providing base station 400 can specify an LTE terminal that is in an environment which is closer to LTE terminal 6.

That is, if CSI estimator 402 of coordination-providing base station 400 configures the CSI that corresponds to LTE terminal 4 that has the RSRP ratio which is within a prescribed range, of LTE terminals 4 and 5, as the CSI estimation value (Slave) between coordination-providing base station 400 and LTE terminal 6, this is desirable. At this point, as the prescribed range, for example, (1±threshold), (RSRP ratio that CoMP application-target terminal has±threshold), or the like is configured.

Furthermore, for example, coordination-providing base station 400 may select on one LTE terminal that has the RSRP ratio which is the closest to 1 or the RSRP ratio that LTE terminal 6 has, as an LTE terminal that is used for the CSI estimation. Alternatively, coordination-providing base station 400 may select one LTE terminal that corresponds to an average value of the CSIs of terminals that has a RSRP ratio which is within a prescribed range (satisfies a threshold), of LTE terminals 4 and 5.

Furthermore, in a case where LTE terminals 4 and 5 each are equipped with a global positioning system (GPS) function, coordination-providing base station 400 may acquire positional information of each of LTE terminals 4 and 5, and may select the LTE terminal that is located the closest to LTE terminal 6.

The CSI estimation processing in coordination-providing base station 400 is described above.

Decision Processing of the Coordinated Communication Control

Next, the coordinated transmission control processing in coordinated transmission control decision unit 302 of connection-making base station 300, which is the processing in ST 205, is described in detail.

FIG. 11 is a diagram that serves to provide a description of an example of the coordinated transmission control processing in connection-making base station 300.

Connection-making base station 300 evaluates estimation precision of a CSI estimation value (Slave) of LTE terminal 6, which is estimated using the CSI (Slave) of LTE-A terminal 4. Connection-making base station 300, for example, as illustrated in FIG. 11, decides the coordinated transmission control processing based on results (5) to (6) of evaluation.

Connection-making base station 300 evaluates the estimation precision of the CSI estimation value (Slave) using the RSRP of LTE terminal 6, and the RSRP of LTE terminal 4, which is used for the CSI estimation.

Specifically, connection-making base station 300 determines whether or not the ratio (RSRP ratio) between the RSRP (Master) and the RSRP (Slave) in LTE terminal 6, and the RSRP ratio in LTE terminal 4, which is used for the CSI estimation, is approximately equal to each other.

For example, in a case where a difference in RSRP ratio between LTE terminal 6 and LTE terminal 4 is at or below a threshold, connection-making base station 300 determines that the RSRP ratios are approximately equal to each other. Furthermore, in a case where a difference between the RSRP ratio that LTE terminal 4 has and "1" is at or below the threshold, connection-making base station 300 may determine that the RSRP ratio between LTE terminal 6 and LTE terminal 4 are approximately equal to each other.

In a case where the RSRP is at the same level, that is, a level of Reference Signal Received Power in a terminal is the same case, it can be said that the received quality (which is equivalent to the Wideband CQI) of the entire frequency band is at the same level. More precisely, when it comes to the result (5) of the evaluation, the RSRP is at the same level, that is, the level of Reference Signal Received Power in the terminal is the same case, and the estimation precision of the Wideband CQI in the CSI, which is used as the CSI estimation value (Slave) of the LTE terminal 6 is evaluated as satisfactory. Connection-making base station 300 performs the transmission control processing (the AMC control) using the Wideband CQI among parameters that are the CSI estimation values (Slave).

In the case of the result (6) of the evaluation that is a result of the evaluation that does not correspond to the result (5) of the evaluation, the estimation precision of the Wideband CQI in the CSI, which is used for the CSI estimation value (Slave) of LTE terminal 6, is evaluated as poor (the CSI estimation precision: C). Connection-making base station 300 does not perform the transmission control that uses the CSI estimation value (Slave).

The decision processing of the coordinated communication control in connection-making base station 300 is described above.

In this manner, according to the present embodiment, connection-making base station 300 instructs coordination-providing base station 400 to estimate the CSI (Slave) of LTE terminal 6. Coordination-providing base station 400 configures the CSI (Slave) that corresponds to an LTE terminal that has a RSRP ratio which is close to 1, of LTE terminals 4 and 5 that have connections, as the CSI estimation value (Slave) between coordination-providing base station 400 and LTE terminal 6. Connection-making base station 300 decides the processing for the coordinated communication control using the CSI (Master) that is reported from LTE terminal 6 and the CSI estimation value (Slave) of LTE terminal 6 that is estimated by coordination-providing base station 400.

That is, according to the present embodiment, connection-making base station 300 uses the CSI of LTE terminal 4 that is in proximity to LTE terminal 6, as the CSI estimation value (Slave) for coordination-providing base station 400 in LTE terminal 6. Accordingly, connection-making base station 300 can optimize the CoMP transmission control using the pieces of CSI (Master and Slave) of both of connection-making base station 300 and coordination-providing base station 400 for LTE terminal 6.

Furthermore, connection-making base station 300 estimates the CSI (Slave) of LTE terminal 6 using the CSI (Slave) for each of LTE terminals 4 and 5 other than LTE terminal 6. Because of this, connection-making base station 100 may acquire only the CSI (Master) for connection-making base station 400 from LTE terminal 6, in the same manner as in the related art. That is, if LTE terminal 6 performs the same processing as in the related art, this is desirable, and LTE terminal 6 does not need to be equipped with a new function for the application of the CoMP transmission.

Consequently, according to the present embodiment, the CoMP transmission can apply also to LTE terminal 6 in the same manner as the CoMP transmission applies to the LTE-A terminal, without extending a function of LTE terminal 6.

Each embodiment according to the aspect of the present disclosure is described above.

According to the aspect of the present disclosure, as described above, the case where the LTE terminal and the LTE-A terminal are present in a mixed manner is assumed. Therefore, according to the aspect of the present disclosure, operations of the first embodiment and the second embodiment may be combined. For example, in a case where LTE-A terminals (1 and 2) are present in the vicinity of LTE terminals (3 and 6), the first embodiment may apply to connection-making base stations (100 and 300) and coordination-providing base stations (200 and 400), and in a case where only LTE terminals (4 and 5) are present in the vicinity of LTE terminals (3 and 6), the second embodiment may apply to connection-making base stations (100 and 300) and coordination-providing base stations (200 and 400).

Furthermore, according to the second embodiment, the case is described where, in coordinated transmission control decision unit 302 of connection-making base station 300, the CSI (Slave) that is estimated by LTE terminal 4 is evaluated using the RSRP ratio. However, the evaluation that uses the RSRP ratio may apply to evaluation of the CSI (Slave) that is estimated by LTE-A terminal 1 according to the first embodiment. That is, the results (5) and (6) of the evaluation, which are illustrated in FIG. 11, may be added to the results (1) to (4) of the evaluation, which are illustrated in FIG. 6. Accordingly, for example, even in a case where the results (1) to (3) of the evaluation, which are illustrated in FIG. 6, does not correspond to any one of the results (1) to (3) of the evaluation, but corresponds to the result (5) of the evaluation, which is illustrated in FIG. 11, the AMC control applies.

Furthermore, each embodiment mentioned above is described, taking as an example the case where the invention according to the aspect of the present disclosure is constituted in hardware, but it is also possible that the invention according to the aspect of the present disclosure is realized in software in cooperation with hardware.

Furthermore, each functional block that is used for the description of each embodiment mentioned above is realized as a Large Scale Integration (LSI) that is typically an integrated circuit. The functional blocks may be provided as individual chips, or some or all of the functional blocks may be provided as integrated in a single chip. The LSI that is here used may be referred to as an Integrated Circuit (IC), a system LSI, a super LSI, or a ultra LSI, depending on difference in the degree of integration.

Furthermore, a technique for circuit integration is not limited to the LSI and may be realized by dedicated circuitry or a general-purpose processor. A Field Programmable Gate Array (FPGA) that is programmable after being manufactured as the LSI, or a reconfigurable processor that allows reconfiguration of connection and configurations of circuit cells within the LSI may be used.

Additionally, if a technology for making circuits integrated appears which substitutes for the LSI by advances in a semiconductor technology or by another technology deriving from the semiconductor technology, the integrating of the functional blocks may be, of course, performed using such a technology. Another possibility is application of a biotechnology and the like.

INDUSTRIAL APPLICABILITY

The invention according to an aspect of the present disclosure is suitable for a communication system that performs CoMP transmission.

REFERENCE MARKS IN THE DRAWINGS 1, 2 LTE-A TERMINAL
3, 4, 5, 6 LTE TERMINAL
10, 20 COMMUNICATION SYSTEM
100, 300 CONNECTION-MAKING BASE STATION
101, 203 ANTENNA
102, 401 RECEPTION PROCESSOR
103 DETERMINER
104, 301, 402 CSI ESTIMATOR
105, 302 COORDINATED TRANSMISSION CONTROL DECISION UNIT
106, 201 COORDINATED TRANSMISSION CONTROLLER
107, 202 TRANSMISSION PROCESSOR
200, 400 COORDINATION-PROVIDING BASE STATION

The invention claimed is:

1. A base station that transmits data to a first terminal in coordination with a connection-making base station, and functions as a coordination-providing base station that receives a transmission parameter that is used for coordinated transmission, from the connection-making base station, comprising:
    a reception unit that receives, from each of at least one or more second terminals other than the first terminal, Channel State Information (CSI) between the coordination-providing base station and each of the at least one or more second terminals, first Reference Signal Received Power (RSRP) indicating received power of a reference signal that is transmitted from the connection-making base station in each of the at least one or more second terminals, and second RSRP indicating received power of a reference signal that is transmitted from the coordination-providing base station in each of the at least one or more second terminals; and
    an estimator that configures the CSI that corresponds to a terminal that has a ratio between the first RSRP and the second RSRP which is within a prescribed range, of the at least one or more second terminals, as an estimation value of CSI between the coordination-providing base station and the first terminal, and notifies the connection-making base station of the configured CSI.

2. A transmission control method in a base station that transmits data to a first terminal in coordination with a connection-making base station, and functions as a coordination-providing base station that receives a transmission parameter that is used for coordinated transmission, from the connection-making base station, comprising:
    receiving, from each of at least one or more second terminals other than the first terminal, Channel State Information (CSI) between the coordination-providing base station and each of the at least one or more second terminals, first Reference Signal Received Power (RSRP) indicating received power of a reference signal that is transmitted from the connection-making base station in each of the at least one or more second terminals, and second RSRP indicating received power of a reference signal that is transmitted from the coordination-providing base station in each of the at least one or more second terminals;
    configuring the CSI that corresponds to a terminal that has a ratio between the first RSRP and the second RSRP which is within a prescribed range, of the at least one or more second terminals, as an estimation value of CSI between the coordination-providing base station and the first terminal; and notifying the connection-making base station of the configured CSI.

* * * * *